United States Patent
Daiminger et al.

(10) Patent No.: US 8,669,726 B2
(45) Date of Patent: Mar. 11, 2014

(54) CONTROL CIRCUIT FOR A WINDOW LIFTER DRIVE

(75) Inventors: Ralf Daiminger, Bamberg (DE); Andre Eberlein, Coburg (DE); Sven Baumann, Breitenbach (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 291 days.

(21) Appl. No.: 13/140,435

(22) PCT Filed: Jan. 22, 2010

(86) PCT No.: PCT/EP2010/000378
§ 371 (c)(1),
(2), (4) Date: Aug. 5, 2011

(87) PCT Pub. No.: WO2010/086123
PCT Pub. Date: Aug. 5, 2010

(65) Prior Publication Data
US 2011/0283619 A1 Nov. 24, 2011

(30) Foreign Application Priority Data
Jan. 29, 2009 (DE) .......................... 10 2009 006 713

(51) Int. Cl.
*H02P 1/00* (2006.01)
(52) U.S. Cl.
USPC ............................ 318/280; 318/483; 318/286
(58) Field of Classification Search
USPC ................. 318/280, 483, 286, 468, 283, 466; 361/46, 104; 307/10.1
See application file for complete search history.

(56) References Cited

U.S. PATENT DOCUMENTS

| | | |
|---|---|---|
| 5,977,732 A | 11/1999 | Matsumoto |
| 2001/0008369 A1 | 7/2001 | Sasaki |
| 2003/0151864 A1 | 8/2003 | Tamura |
| 2004/0212339 A1 | 10/2004 | Terakawa et al. |
| 2006/0055244 A1 | 3/2006 | Ito et al. |
| 2010/0244560 A1* | 9/2010 | Sato et al. ..................... 307/10.1 |

FOREIGN PATENT DOCUMENTS

| | | |
|---|---|---|
| DE | 10028490 A1 | 1/2001 |
| DE | 10033037 A1 | 2/2001 |
| DE | 102005055272 B4 | 5/2007 |
| DE | 112005002151 T5 | 8/2007 |

OTHER PUBLICATIONS

International Preliminary Report on Patentability; Dated Aug. 2, 2011; for corresponding International Application No. PCT/EP2010/000378.

* cited by examiner

*Primary Examiner* — Karen Masih
(74) *Attorney, Agent, or Firm* — Mendelsohn, Drucker & Dunleavy, P.C.; Steve Mendelsohn

(57) ABSTRACT

The invention in certain embodiments relates to a control circuit for an electric-motor-operated window lifter (10) of a motor vehicle (1), the control circuit having a first switch (11) for opening a vehicle window (7), a second switch (12) for closing the vehicle window (7), and a control device (15), which, when one of the switches (11, 12) is activated, actuates the window lifter (10) to move the vehicle window (7) in the opening direction or closing direction. The control device (15) monitors the lighting current ($I_{LED}$) which flows across a lighting element (14) for the switches (11, 12), and generates a control signal ($I_{12}$), if appropriate, for opening the vehicle window (7) if the lighting current ($I_{LED}$) exceeds an overcurrent threshold value ($I_{Ref}$) thereby detecting inundation of the vehicle.

21 Claims, 2 Drawing Sheets

CONTROL CIRCUIT FOR A WINDOW LIFTER DRIVE

BACKGROUND

1. Field of the Invention

The invention relates to a control circuit for an electric-motor-operated window lifter drive of a motor vehicle, having a first and a second switch for opening and, respectively, closing a vehicle window, as well as having a control device, which, when the switches are activated, actuates the window lifter drive, and having a device for detecting inundation of the vehicle.

2. Description of the Related Art

A window lifter drive which is also referred to below as a window lifter and which is used to lift (close) and lower (open) a vehicle window in a motor vehicle usually comprises an electric motor which is generally coupled via a transmission gearing to the vehicle window and is actuated by means of an electronic control unit. For this purpose, a control device supplies pulses or signals to a relay circuit in the form of two individual relays or a double relay in order to energize the electric motor in opposing directions and therefore drive the electric motor in opposing directions of rotation. In addition to or instead of relays it is also possible to use power semiconductors, for example four MOSFETs in a bridge circuit.

The electric-motor-operated drive is usually actuated by means of switches or pushbutton keys which are accessible to an operator in the motor vehicle for the vehicle window which is to be respectively moved. After the activation of the respective switch or pushbutton key, the control device is actuated in order to move the vehicle window into the open position or closed position. The control signals which are generated by the respective switches can be conducted in the form of high levels and low levels or changes in level to inputs of the control device, which is generally embodied as a microcontroller or comprises a microcontroller.

Undefined states or levels at the signal inputs of the control device are problematic here, with the result that a correct interpretation is not ensured. Undefined states occur, in particular, if moisture and, in particular, water penetrates the switch system which comprises the switching contacts of the switches or pushbutton keys for lifting and lowering the vehicle window.

In particular when the vehicle is immersed in body of water, the vehicle and therefore the control circuit are inundated. Undefined level states which are caused as a result of this and which result from short-circuits can lead to the vehicle window no longer being able to be opened in order to permit the vehicle occupants to use the window to exit from the vehicle which has been involved in an accident.

In order to counter this problem and to ensure reliable opening of the respective vehicle window even in a vehicle which has been inundated, for example German patent DE 100 28 490 A1 discloses generating an inundation signal, by means of an additional indundation detector circuit, if the vehicle is inundated. Such a detector signal causes the energy supply to the relay which is responsible for the movement of the window pane in the closing direction to be interrupted, with the result that the vehicle window can then only be driven into the open position. A similar control circuit with an additional immersion opening switch is known, for example, from German patent DE 601 11 665 T2.

U.S. Pat. No. 6,690,131 (EP 1 207 261 A1) discloses a circuit with a wetness detector which, on detecting a wet or thoroughly wet control circuit, generates a signal which is intended to prevent unintentional lifting or lowering of the vehicle window.

SUMMARY

The invention, in certain embodiments, is based on the object of specifying a control circuit of the type mentioned at the beginning which uses simple means to ensure reliable control of a window lifter drive, even in the case of inundation.

This object is achieved according to certain embodiments of the invention. For this purpose, there is provision for the lighting current of a lighting element for the switches for opening and closing the vehicle window to be monitored and for a control signal to be generated if the lighting current exceeds an overcurrent threshold value as a result, for example, of penetrating water or penetrating wetness.

For this purpose, an alternative switch logic or control logic which differs from the normal state in which the lighting current undershoots the overcurrent threshold value can be activated, which switch logic or control logic actuates, in the event of such a fault with, for example, short-circuited switch contacts, the window lifter drive in the direction of lowering the vehicle window. Such a switch logic or control logic with preferably automatic lowering of the window is expediently implemented by means of suitable software of the control device.

The invention, in certain embodiments, is based here on the idea that, in a control circuit for an electric-motor-operated window lifter, a lighting device is usually provided. This lighting device, embodied in particular in the form of an LED or a filament lamp, is generally operated continuously and requires a certain lighting current. Since it is known that it can be assumed that, in the case of inundation of the vehicle, water which is necessarily present or at least moisture in the vicinity of the respective lighting element causes significant shunting resistances against the vehicle ground or against ground connections in the switch, in such a case of inundation, the overall resistance will decrease and accordingly the lighting current will increase because the shunt resistances which are due to dirt will be electrically parallel to the internal resistance of the lighting element.

The change in the lighting current is therefore known to be an indication of a case of inundation and can therefore be used as a particularly simple and reliable means of detecting such a case of inundation. In turn, a switching criterion or control criterion which ensures reliable actuation of the window lifter drive in the opening direction of the vehicle window can be generated on the basis of the detected change in the lighting current.

In order to monitor and/or detect the lighting current, a measuring resistor (shunt) is suitably used as a current sensor, which, for this purpose, is expediently connected in series with the lighting element. A control signal which can be tapped at this current sensor is suitably fed to a control input of the control device. In the case of the shunt, a voltage tap whose voltage value (level) at a known resistance value of the current sensor is a measure of the lighting current expediently occurs.

The two switches (pushbutton keys) generate, when activated, a corresponding control instruction in that an operating voltage is connected to ground, preferably via current-limiting resistors, by means of the switching contacts of the switches. In this context, high levels in the case of opened switching contacts and low levels in the case of closed switching contacts occur by means of corresponding voltage dividers which are connected to signal inputs of the control device, expediently in the manner of low-active switches, at the control device inputs.

In parallel to these switches or switching contacts, the lighting element is expediently supplied by the supply voltage via a driver circuit actuated by the control device. The control device, which is connected to the driver circuit via a corresponding signal output, therefore causes the driver circuit to be switched on and off with the result that the lighting element is, or is not, supplied with the lighting current. In this context, the lighting current which flows via the current sensor (shunt) is detected continuously and evaluated by means of software or a corresponding algorithm of the control device. For this purpose, an overcurrent threshold value of, for example, twice the nominal lighting current can be predefined. If this overcurrent threshold value is exceeded by the present lighting current, the control device generates a corresponding control signal which ensures reliable opening of the vehicle window.

The switches (pushbutton keys) with the corresponding switching contacts for the opening instruction or closing instruction to the control device, which itself implements this control instruction through corresponding actuation of the relay circuit in order to activate the drive motor in the corresponding movement direction of the vehicle window, are arranged in a switch housing, into which the lighting element is also suitably integrated.

The advantages which are achieved with certain embodiments of the invention include, in particular, in the fact that inundation of the vehicle is detected with simple means by detecting a change in the lighting current which flows through a lighting element for the operator control switches (pushbutton keys) of a window lifter of a motor vehicle. A voltage which can expediently be tapped at a shunt as a preferred current sensor, which is connected in series with the lighting element and between two signal inputs of the control device, which voltage is proportional to the lighting current and can be used, as it were, as an inundation signal, can be detected particularly easily and can be reliably evaluated by means of the control device with respect to correct actuation of the window lifter.

A particularly reliable control circuit of the window lifter with an unambiguous control signal for opening the vehicle window is therefore made available which considerably increases the safety of the vehicle occupants, in particular in the event of an inundation accident of the motor vehicle.

BRIEF DESCRIPTION OF THE DRAWINGS

An exemplary embodiment of the invention will be explained in more detail below with reference to a drawing, in which.

Parts which correspond to one another are provided with the same reference symbols in both figures.

DETAILED DESCRIPTION

Figure 1:
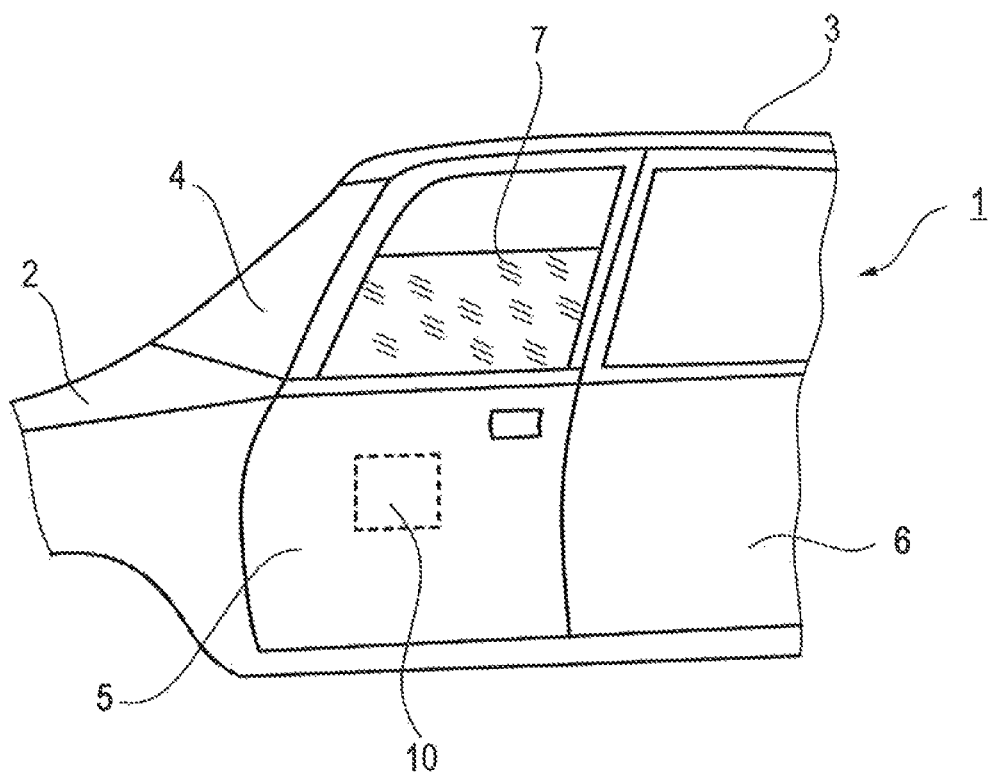
FIG. 1 is a schematic side view of a detail of a motor vehicle.

FIG. 1 is a schematic side view of a motor vehicle 1, of which the engine hood 2, the vehicle roof 3 and the windshield 4 can be seen. Furthermore, a front door (driver's door) 5 and a rear door (driver-side rear door) 6 can be seen. The front door 5 has an electrically driven vehicle window 7. A window lifter 10 which is indicated by dashed lines is usually mounted in the vehicle door (door module).

Figure 2:
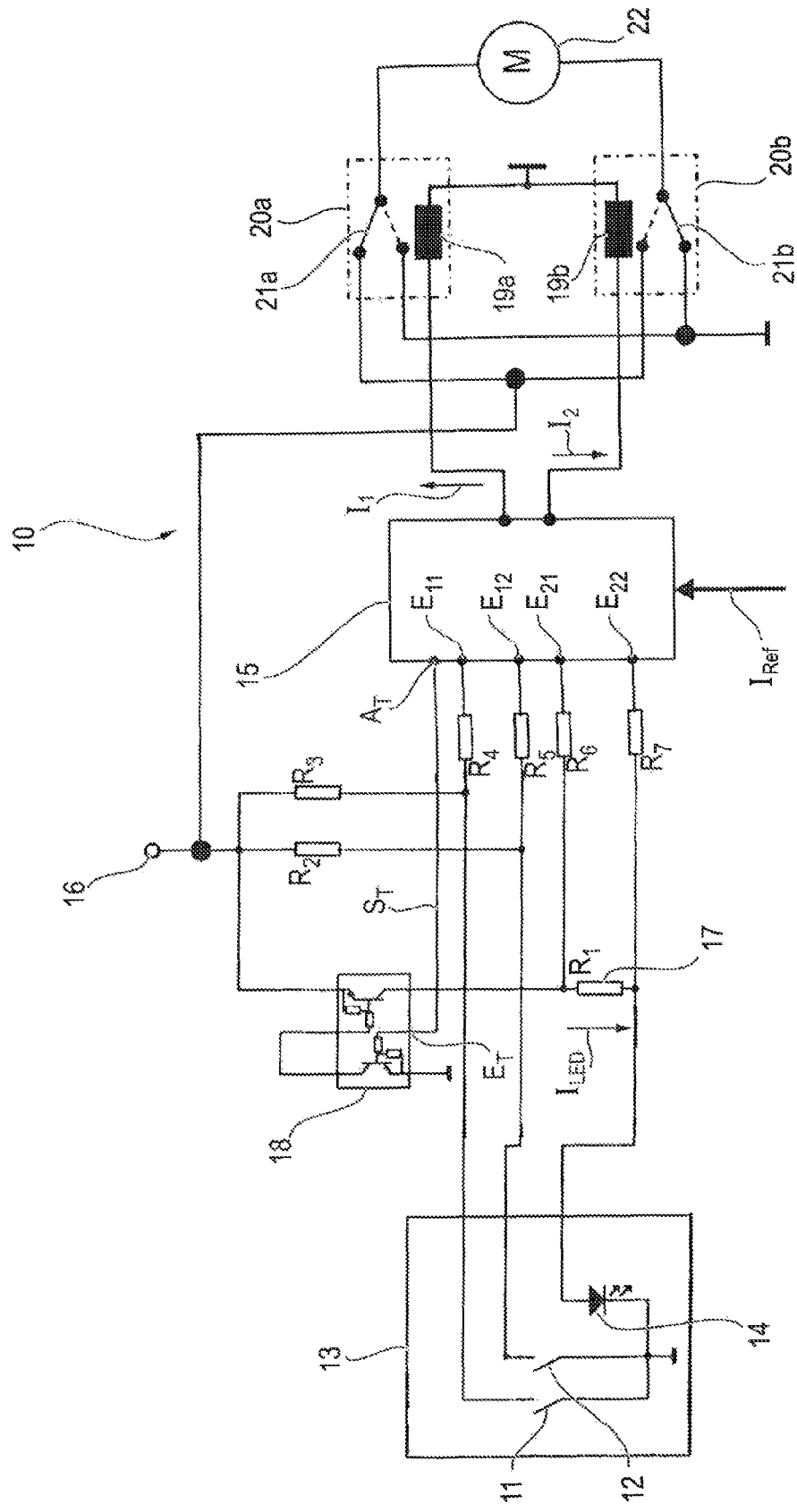
FIG. 2 is a schematic view of a block circuit diagram of a control circuit according to one embodiment of the invention for detecting inundation for an electric-motor-operated window lifter drive of the motor vehicle.

FIG. 2 shows the block diagram of a control circuit for the electric-motor-operated window lifter 10 which is referred to below as window lifter drive. The control circuit comprises a first switch or pushbutton key 11 for generating a closing instruction and a further switch or pushbutton key 12 for generating an opening instruction for the window lifter drive in order to close the vehicle window 7. The two switches 11, 12 are arranged in a switch housing or pushbutton key housing 13 into which a lighting element 14 of the control circuit is also suitably integrated. The lighting element 14 is illustrated as a light-emitting diode (LED).

The control circuit also comprises a control device 15 with a microcontroller or in the form of a microcontroller. The control device 15 has a first signal input $E_{11}$ to which the switch 11, which is connected at the other end to ground, is connected via an ohmic resistor R4. In an analogous fashion, the second switch 12, which is also connected at the other end to ground, is connected via an ohmic resistor R5 to a second signal input $E_{12}$ of the control device 15.

The resistors R4 and R5 are each part of a voltage divider R3, R4 or R2, R5, respectively. The voltage dividers are connected to a common voltage terminal 16. The vehicle battery with an on-board power system voltage of usually $U_B=12V$ serves as the supply voltage. The resistors R3 and R4 or R2 and R5, respectively, which are connected into the voltage dividers bring about a low level at the inputs $E_{11}$ and $E_{12}$ in the case of the closing of the switch contacts of the switches 11 and 12 and a high level when the switches 11, 12 are opened.

The lighting element 14 is also connected to the voltage terminal 16 via a shunt R1 which is effective as a current sensor 17. A driver circuit 18 with two correspondingly connected bipolar transistors is connected upstream of the current sensor 17. A control input $E_T$ of the driver circuit 18 is connected to a control output $A_T$ of the control device 15.

Actuation of the driver circuit 18 by means of a control signal $S_T$, which is generated by the control device 15, for switching on the lighting device, causes a lighting current $I_{LED}$ to flow across the shunt R1 and across the lighting element 14. A voltage signal $U_{LED}=I_{LED} \cdot R1$ which can be tapped at the shunt R1 is connected to further signal inputs $E_{21}$ and $E_{22}$ of the control device 15 via resistors R6, R7 which serve to limit the current.

A change $\Delta I_{LED}$ in the lighting current $I_{LED}$ therefore leads to a corresponding change $\Delta U_{LED}$ in the voltage, which is detected by the current sensor 17 and evaluated by a corresponding algorithm (software) of the control device 15. For this purpose, in a way which is not illustrated in more detail, the lighting current $I_{LED}$, which is proportional to the detected voltage signal $U_{LED}$ is compared with a corresponding reference threshold value or overcurrent threshold value $I_{Ref}$. At the shunt R1, which is connected in series with the lighting element 14 and between the two signal inputs $E_{11}$, $E_{12}$ of the control device 15, as a preferred current sensor 17, a voltage $U_{LED}$, which is proportional to the lighting current $I_{LED}$ can thus be tapped, as it were, as an inundation signal for the control device 15.

If, as a result of this comparison, the detected lighting current $I_{LED}$ exceeds the predefined threshold value $I_{Ref}$, for example by twice the nominal value of the current value of the lighting current $I_{LED}$ which is characteristic of fault-free operation, the control device 15 generates at the output end a control signal $I_{12}$ for opening the vehicle window 7. The control signal $I_{12}$ leads directly or indirectly to corresponding coil currents $I_1$, $I_2$ for relay coils 19a, 19b of a relay circuit with two relays 20a, 20b whose relay contacts 21a and 21b, respectively, are connected to an electric motor 22 and to the voltage terminal 16 as well as to ground.

During normal operation, owing to the activation of the switch 11 or 12, corresponding coil currents $I_1$, $I_2$ are generated, which leads either to the uninterrupted switch position of the relay contacts 21a and 21b respectively, or to their switch position which is indicated by dot-dash lines with the result that the electric motor 22 is energized in one or the other direction. As a result, the vehicle window 7 moves into the open position or into the closed position as a function of the direction of rotation of the electric motor 22.

If, in contrast, an overcurrent is detected by the current sensor 17 in the case of inundation of the vehicle with the result of the penetration of water or wetness into parts of the control circuit, then the control device 15 detects the case of inundation by comparing the detected overcurrent $I_{LED}$ with the reference value $I_{Ref}$. The control device 15 generates the corresponding control signal $I_{12}$ in order to actuate the window lifter drive 10 with the stipulation that the vehicle window 7 is to be moved reliably into the open position. For this purpose, the software of the control device 15 can activate a switch logic which is alternative to the normal operating mode and which starts a reliable adjustment movement of the vehicle window 7 in the lowering direction.

When the alternative switch logic is entered, the lighting device 14 for the switches 11, 12 can advantageously be switched off by virtue of the fact that the control device 15 actuates the driver circuit 18 with a corresponding control instruction $S_T$ to switch off the lighting element 14. As a result, an undesired or undefined level state due to inundation—induced shunt resistances at the signal input $E_{11}$, $E_{12}$ of the control device 15 is ruled out. The reliability of the signal level which is read in at the current sensor 17, i.e. by the shunt R1, is therefore increased.

The invention claimed is:

1. A control circuit for an electric-motor-operated window lifter of a motor vehicle, the control circuit comprising:
   a first switch adapted to open a vehicle window;
   a second switch adapted to close the vehicle window;
   a control device, which, when one of the switches is activated, actuates the window lifter to move the vehicle window in an opening direction or a closing direction, wherein:
      the control device is adapted to monitor a lighting current which flows across the lighting element for the switches and generate a control signal for opening the vehicle window if the control device determines that the lighting current exceeds an overcurrent threshold value as a result of inundation of the vehicle.

2. The control circuit as claimed in claim 1 further comprising a current sensor connected to a signal input of the control device and adapted to detect the lighting current.

3. The control circuit as claimed in claim 1, wherein the first switch and the second switch are respectively connected to two signal inputs of the control device via respective voltage dividers connected to a voltage terminal of a voltage supply.

4. The control circuit as claimed in claim 1, wherein the lighting element is connected to a driver circuit which is connected to a control output of the control device in order to switch the lighting element on and off.

5. The control circuit as claimed in claim 4, wherein a current sensor is connected to a voltage supply via the driver circuit.

6. The control circuit as claimed in claim 2, wherein the current sensor is connected to the control device via at least one current-limiting resistor.

7. The control circuit as claimed in claim 2, wherein the current sensor is a resistor which is connected in series with the lighting element and between two signal inputs of the control device, and at which a voltage which is proportional to the lighting current can be tapped as an inundation signal for the control device.

8. The control circuit as claimed in claim 1, wherein the control device is connected on the output side to a relay circuit for activating the window lifter in the opening direction or the closing direction of the vehicle window.

9. The control circuit as claimed in claim 1, wherein the lighting element is integrated into a switch housing for the two switches.

10. The control circuit as claimed in claim 1 further comprising a current sensor connected to a signal input of the control device and adapted to detect the lighting current, wherein:
    the first switch and the second switch are respectively connected to two signal inputs of the control device via respective voltage dividers connected to a voltage terminal of a voltage supply;
    the lighting element is connected to a driver circuit which is connected to a control output of the control device in order to switch the lighting element on and off;
    the current sensor is connected to the voltage supply via the driver circuit;
    the current sensor is connected to the control device via at least one current-limiting resistor;
    the current sensor is a resistor which is connected in series with the lighting element and between two other signal inputs of the control device, and at which a voltage which is proportional to the lighting current can be tapped as an inundation signal for the control device;
    the control device is connected on an output side to a relay circuit for activating the window lifter in the opening direction or the closing direction of the vehicle window; and
    the lighting element is integrated into a switch housing for the two switches.

11. An electric-motor-operated window lifter for a motor vehicle, the window lifter comprising:
    a motor adapted to open and close a vehicle window; and
    a control circuit adapted to control the motor, the control circuit comprising:
       a first switch adapted to open the vehicle window;
       a second switch adapted to close the vehicle window;
       a lighting element for the switches; and
       a control device, which, when one of the switches is activated, actuates the window lifter to move the vehicle window in an opening direction or a closing direction, wherein:
          the control device is adapted to monitor a lighting current which flows across the lighting element for the switches and generate a control signal for opening the vehicle window if the control device determines that the lighting current exceeds an overcurrent threshold value as a result of inundation of the vehicle.

12. A motor vehicle comprising:
    a vehicle window; and
    an electric-motor-operated window lifter for the vehicle window, the window lifter comprising:
       a motor adapted to open and close the vehicle window; and a control circuit adapted to control the motor, the control circuit comprising:
  a first switch adapted to open the vehicle window;
  a second switch adapted to close the vehicle window;
  a lighting element for the switches; and
  a control device, which, when one of the switches is activated, actuates the window lifter to move the vehicle window in an opening direction or a closing direction, wherein:
    the control device is adapted to monitor a lighting current which flows across the lighting element for the switches and generate a control signal for opening the vehicle window if the control device determines that the lighting current exceeds an overcurrent threshold value as a result of inundation of the vehicle.

13. The motor vehicle as claimed in claim 12, wherein, whenever the control device determines that the lighting current exceeds the overcurrent threshold value as the result of the inundation of the vehicle, the control device generates the control signal to automatically open the vehicle window.

14. The motor vehicle as claimed in claim 12, wherein the first switch and the second switch are respectively connected to two signal inputs of the control device via respective voltage dividers connected to a voltage terminal of a voltage supply.

15. The motor vehicle as claimed in claim 12, wherein:
the control circuit further comprises a current sensor connected to a signal input of the control device and adapted to detect the lighting current; and
the current sensor is connected to the control device via at least one current-limiting resistor.

16. The motor vehicle as claimed in claim 12, wherein:
the control circuit further comprises a current sensor connected to a signal input of the control device and adapted to detect the lighting current; and
the current sensor is a resistor which is connected in series with the lighting element and between two signal inputs of the control device, and at which a voltage which is proportional to the lighting current can be tapped as an inundation signal for the control device.

17. The control circuit as claimed in claim 1, wherein, whenever the control device determines that the lighting current exceeds the overcurrent threshold value as the result of the inundation of the vehicle, the control device generates the control signal to automatically open the vehicle window.

18. The electric-motor-operated window lifter as claimed in claim 11, wherein, whenever the control device determines that the lighting current exceeds the overcurrent threshold value as the result of the inundation of the vehicle, the control device generates the control signal to automatically open the vehicle window.

19. The electric-motor-operated window lifter as claimed in claim 11, wherein the first switch and the second switch are respectively connected to two signal inputs of the control device via respective voltage dividers connected to a voltage terminal of a voltage supply.

20. The electric-motor-operated window lifter as claimed in claim 11, wherein:
the control circuit further comprises a current sensor connected to a signal input of the control device and adapted to detect the lighting current; and
the current sensor is connected to the control device via at least one current-limiting resistor.

21. The electric-motor-operated window lifter as claimed in claim 11, wherein:
the control circuit further comprises a current sensor connected to a signal input of the control device and adapted to detect the lighting current; and
the current sensor is a resistor which is connected in series with the lighting element and between two signal inputs of the control device, and at which a voltage which is proportional to the lighting current can be tapped as an inundation signal for the control device.

* * * * *